United States Patent [19]
Tsunoda et al.

[11] Patent Number: 5,337,073
[45] Date of Patent: Aug. 9, 1994

[54] PORTABLE RADIO EQUIPMENT WITH A DISPLAY BACK-LIGHTING FUNCTION

[75] Inventors: Hideyuki Tsunoda, Tokyo; Toshirou Nishiyama, Shizuoka, both of Japan

[73] Assignee: NEC Corporation, Tokyo, Japan

[21] Appl. No.: 911,385

[22] Filed: Jul. 13, 1992

Related U.S. Application Data

[63] Continuation of Ser. No. 434,051, Nov. 9, 1989, abandoned.

[30] Foreign Application Priority Data

Nov. 9, 1988 [JP] Japan .................. 63-281440

[51] Int. Cl.$^5$ .............................................. G09G 3/18
[52] U.S. Cl. ....................................... 345/102; 345/76; 345/207
[58] Field of Search ............. 340/781, 784, 811, 805, 340/825.44, 825.81; 315/169.1, 169.3; 313/507–510; 350/345; 345/76, 77, 78, 79, 80, 81, 102, 207

[56] References Cited

U.S. PATENT DOCUMENTS

| | | | |
|---|---|---|---|
| 4,024,389 | 5/1977 | Kanatani et al. | 250/213 R |
| 4,562,478 | 12/1985 | Hirasawa et al. | 340/784 |
| 4,713,659 | 12/1987 | Oyagi et al. | 340/825.44 |
| 4,754,275 | 6/1988 | Abbaticchio et al. | 340/825.44 |
| 4,868,459 | 9/1989 | Dennerlein et al. | 350/345 |
| 4,868,563 | 9/1989 | Stair et al. | 340/825.44 |

*Primary Examiner*—Alvin E. Oberley
*Assistant Examiner*—Steven J. Saras
*Attorney, Agent, or Firm*—Sughrue, Mion, Zinn, Macpeak & Seas

[57] ABSTRACT

Portable radio equipment having a display for displaying a message and an illuminating device for back-lighting the display. The illuminating device has a function of back-lighting the display and a function of sensing illumination on the surface of the display. Implemented by an electroluminescent lamp, the illuminating device back-lights the display surely and, yet, without wasteful consumption of power.

2 Claims, 7 Drawing Sheets

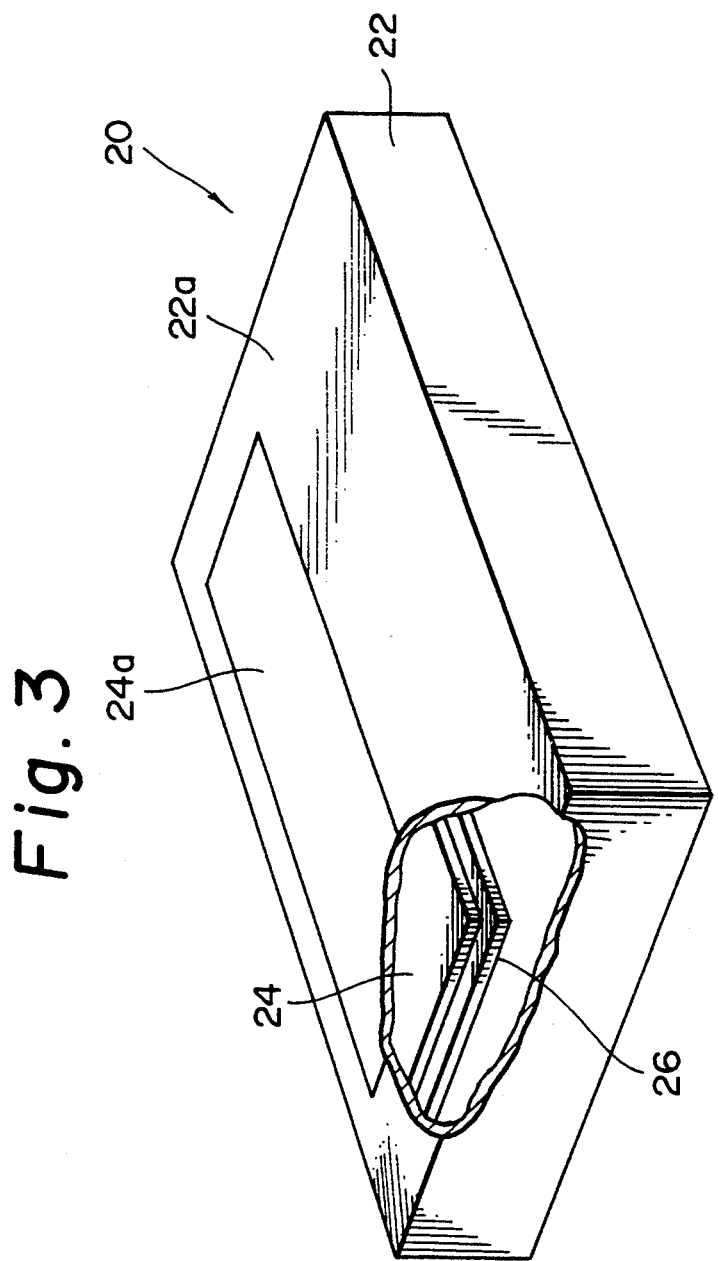

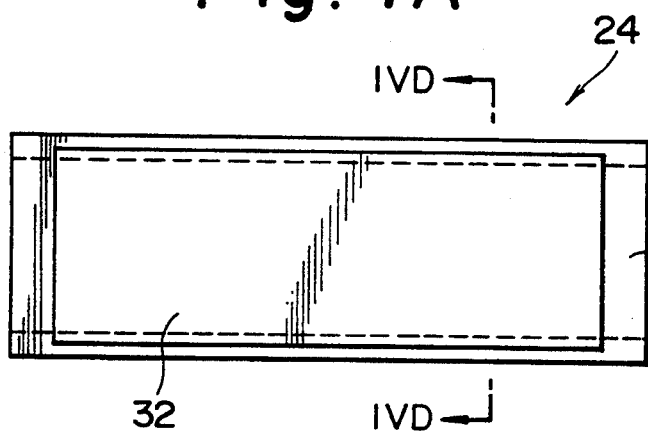
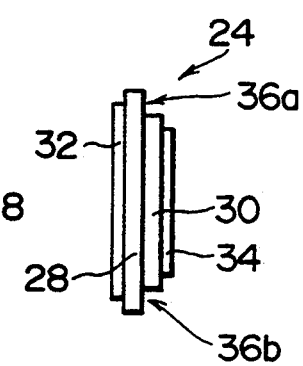
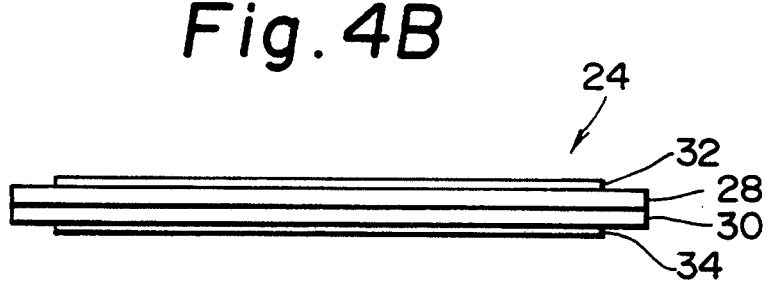
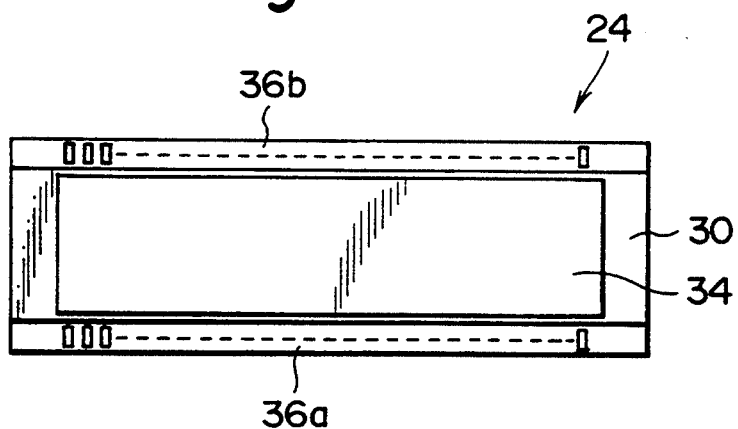

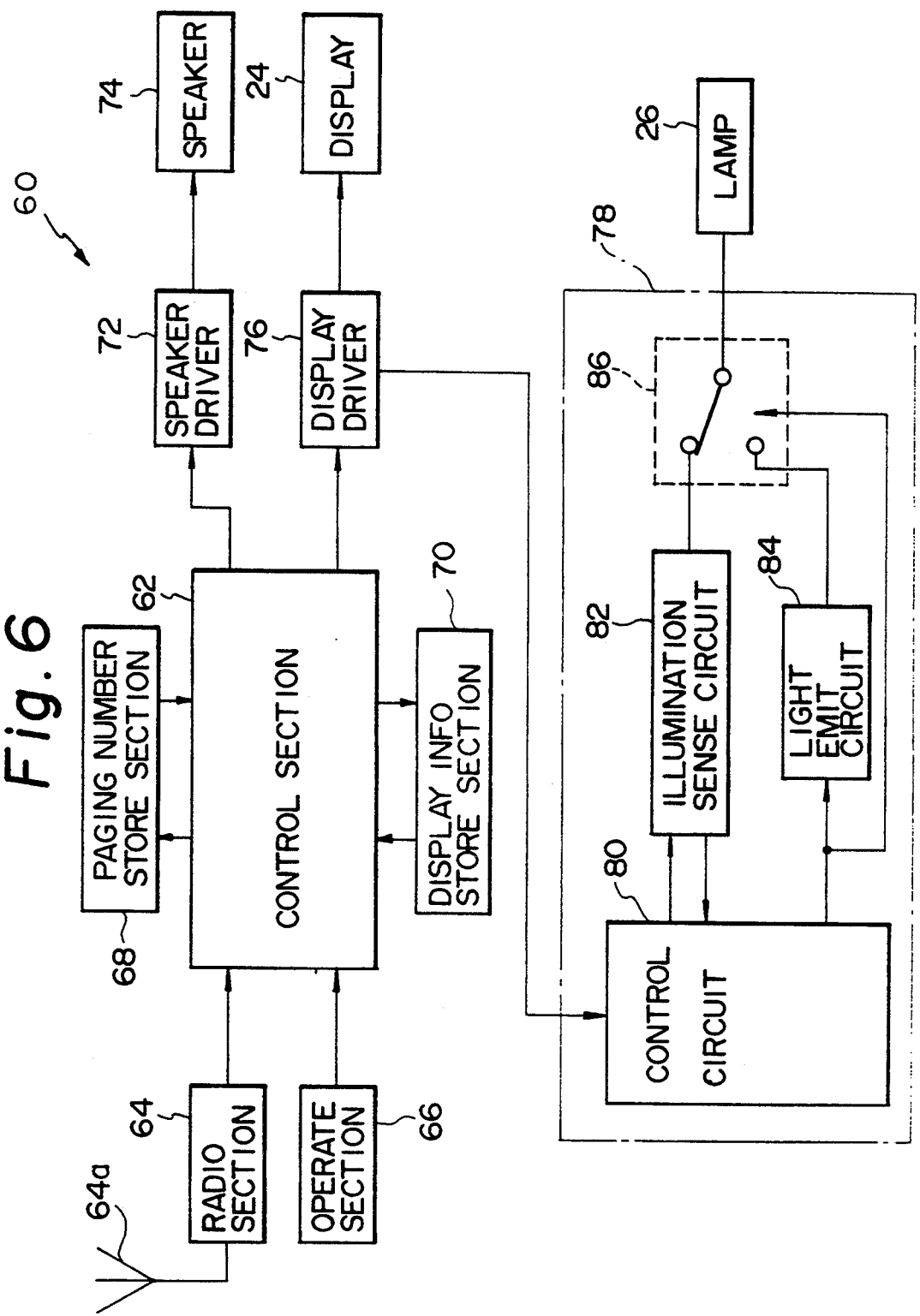

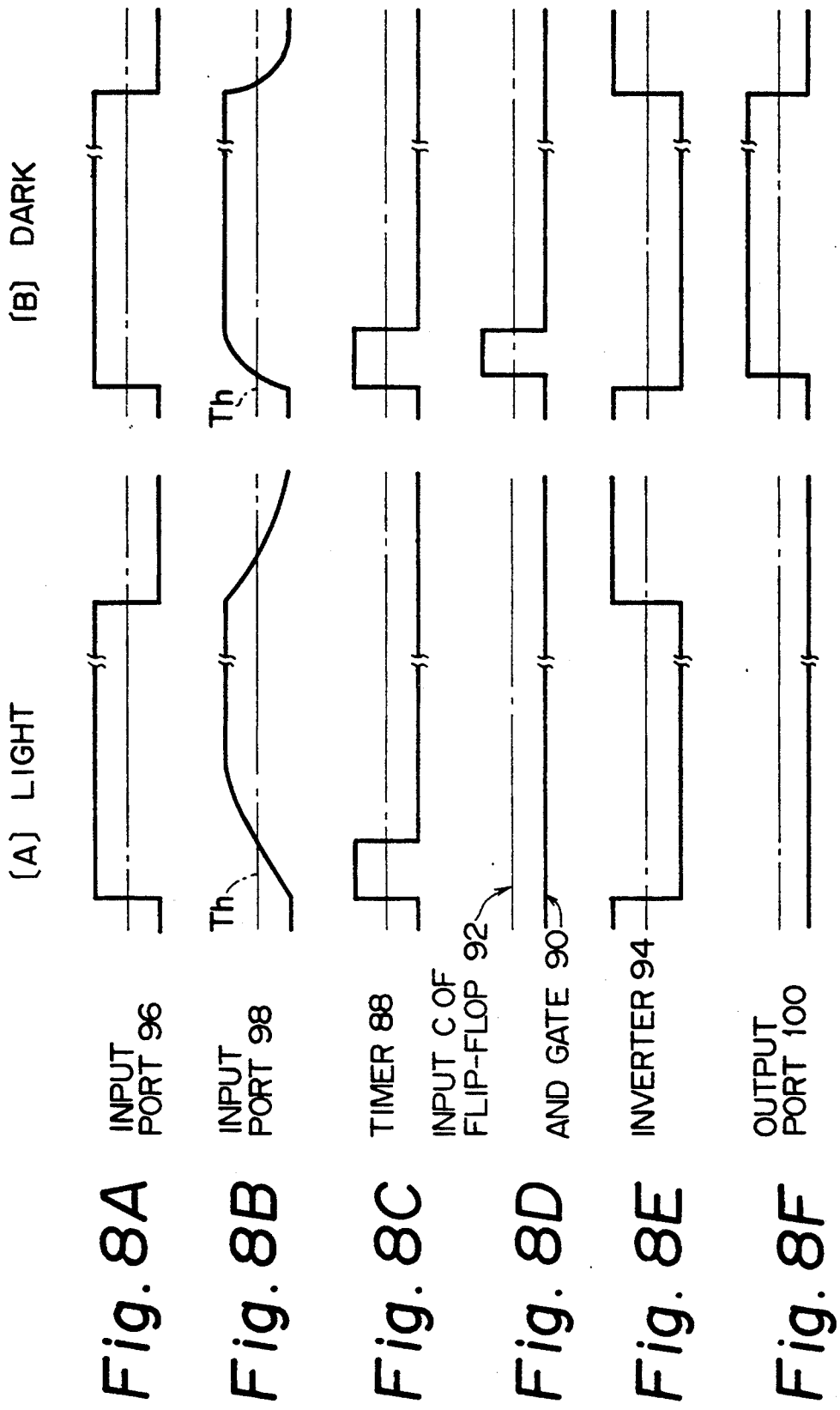

PORTABLE RADIO EQUIPMENT WITH A DISPLAY BACK-LIGHTING FUNCTION

This is a Continuation of Application No. 07/434,051 filed Nov. 9, 1989 now abandoned.

BACKGROUND OF THE INVENTION

The present invention relates to portable radio equipment having a liquid crystal display (LCD) or similar display which itself does not emit light and, more particularly, to portable radio equipment having a function of back-lighting a display thereof by an electroluminescent (EL) lamp.

With portable radio equipment of the type described, it has been customary to back-light a display by the following implementation. Specifically, a phototransistor or similar light-sensitive element is so disposed as to sense light, or illumination, around the display, while a light-sensitive circuit is connected to the light-sensitive element. An output of the light-sensitive circuit representative of a dark condition and an output indicating that the display is in operation are ANDed. The resulting AND output operates a driver associated with a light source so as to energize a light emitting element which is independent of the light-sensitive element, whereby the display is back-lighted. A problem with this kind of prior art equipment is that the light-sensitive element responsive to illumination is simply located relatively close to the display to sense illumination around the display. Specifically, the light-sensitive element cannot sense the illumination of light incident to the display directly. Hence, when spot light is incident to the light-sensitive element only and not to the display, the display is not back-lighted at all despite that it is too dark to see. Conversely, when spot light illuminates only the display, the display is back-lighted despite that it is readable without back-light. Such wasteful consumption of power has to be eliminated because this type of radio equipment is powered by a miniature battery whose capacity is small. Another problem is that the equipment needs a casing which has an exclusive opening for the light-sensitive element, in addition to an opening which is associated with the display.

SUMMARY OF THE INVENTION

It is therefore an object of the present invention to provide portable radio equipment which directly senses light incident to a display itself and thereby senses the illumination on the display with accuracy to surely back-light the display.

It is another object of the present invention to provide portable radio equipment with a display back-lighting function which eliminates wasteful power consumption and thereby promotes efficient power supply.

It is another object of the present invention to provide generally improved portable radio equipment having a display back-lighting function.

In accordance with the present invention, portable radio equipment having a display for displaying a message comprises an illuminating device having a function of back-lighting the display and a function of sensing illumination on a display surface of the display, a first driver for driving the illuminating device to sense illumination on the display surface of the display, a second driver for driving the illuminating device to cause the illuminating device to emit light, a switching circuit for selecting either one of an illumination sense mode wherein the illuminating device senses illumination and a back-light mode wherein the illuminating device emits light, and a control circuit for controlling the first and second drivers and switching circuit to select either one of the illumination sense mode and back-light mode.

Also, in accordance with the present invention, in portable radio equipment having a display for displaying and a message, and illuminating device for back-lighting the display, the illuminating device has a function of back-lighting the display and a function of sensing illumination on a display surface of the display.

Further, in accordance with the present invention, a control device for use with portable radio equipment having a display for displaying and a message and illuminating device having function of back-lighting the display and a function of sensing illumination on a display surface of the display for controlling the illuminating device comprises a first driver for driving the illuminating device to sense illumination on the display surface of the display, a second driver for driving the illuminating device to cause the illuminating device to emit light, a switching circuit for selecting either one of an illumination sense mode wherein the illuminating device senses illumination and a back-light mode wherein the illuminating device emits light, and a control circuit for controlling the first and second drivers and switching circuit to select either one of the illumination sense mode and back-light mode.

BRIEF DESCRIPTION OF THE INVENTION

The above and other objects, features and advantages of the present invention will become more apparent from the following detailed description taken with the accompanying drawings in which:

FIG. 3 is a perspective view of portable radio equipment embodying the present invention;

FIG. 4A is a plan view of a display of the equipment shown in FIG. 3;

FIG. 4B is a front view of the display;

FIG. 4C is a bottom view of the display;

FIG. 4D is a section along line IVD—IVD of FIG. 4A;

FIG. 6 is a schematic block diagram showing control circuitry associated with the equipment of FIG. 3;

FIGS. 8A to 8F are timing charts useful for understanding the operation of the control unit shown in FIG. 7.

DESCRIPTION OF THE PREFERRED EMBODIMENT

Figure 1:
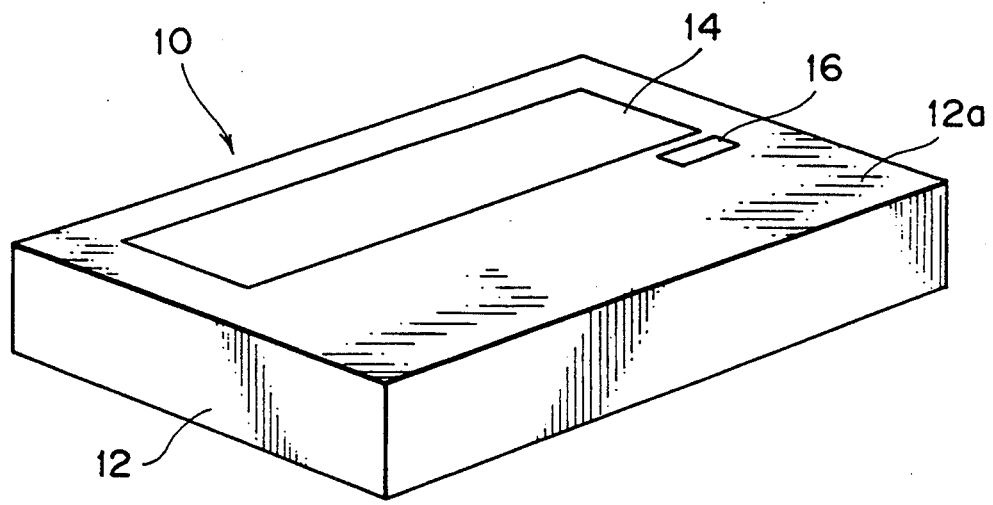
FIG. 1 is a perspective view of prior art portable radio equipment having a display back-lighting function.

To better understand the present invention, a brief reference will be made to prior art portable radio equipment with a back-lighting capability, shown in FIG. 1. As shown, the radio equipment, generally 10, has an opaque casing 12 which is made of ABS (Acrylonitrile Butadiene Styrene)resin, for example. The casing 12 accommodates therein an LCD or similar display and a light emitting element or similar light source for back-lighting the display, although not shown in the figure. One major surface 12a of the casing 12 which faces the display surface of the display is provided with an opening or display window 14. Also formed through the surface 12a is an exclusive opening 16 through which a light-sensitive element senses light around the display window 14. In a strict sense, however, the illumination sensed by the light-sensitive element is not the illumination on the display surface of the display, and it is the illumination on the surface of the light-sensitive element which is located in the vicinity of the display surface, i.e., display window 14 and illuminated through the opening 16, as discussed previously. Hence, even when the surface of the display is too dark to see and, therefore, needs back-light, the light emitting element or light source will not be turned on if light is incident only to the surface of the light-sensitive element. Conversely, when the surface of the display is sufficiently lighted and does not need back-light, the light emitting element will be turned on if the light is not incident to the light-sensitive element, resulting in wasteful consumption of power. Further, forming the exclusive opening 16 through the casing 12 in addition to the display window 14 increases the number of production steps and, therefore, the production cost.

Figure 2:
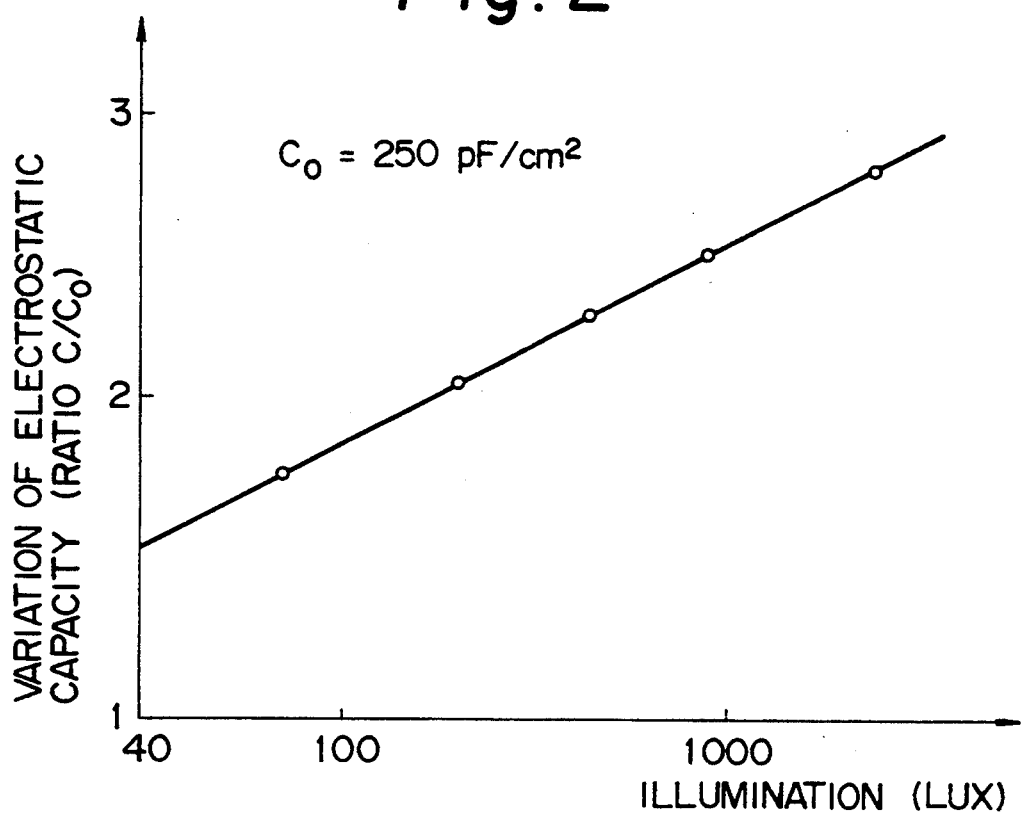
FIG. 2 is a graph showing an electrostatic capacity to illumination characteristic of an EL lamp.

In accordance with the present invention, a single element, i.e., a single EL lamp serves the function of the light emitting element adapted for back-light and the function of the light-sensitive element responsive to the illumination of the surface of the display. Specifically, an EL lamp not only emits light for illuminating the display from the back but also changes its electrostatic capacity in response to the light therearound. FIG. 2 plots experimentally determined variation of electrostatic capacity of an EL lamp (NEL-SL-376-W-EL LAMP) with respect to illumination. As shown, when the illumination is sequentially changed from 40 luxes, the ratio of the electrostatic capacity C of an EL lamp to the electrostatic capacity Co per unit area (250 picofarads per square centimeter) changes little by little. It will therefore be seen that the electrostatic capacity of an EL lamp is greater in a light place than in a dark place. Assuming that the area of an EL lamp associated with a display surface having certain area is 10 square centimeter, for example, the electrostatic capacity is about 3.5 nanofarads in a dark place and about 8.0 nanofarads in a light place which is more than twice greater than the former. By using such a characteristic of an EL lamp, the present invention assigns not only the back-lighting function but also the illumination sensing function to an EL lamp.

Referring to FIG. 3, portable radio equipment with a back-lighting capability embodying the present invention is shown and generally designated by the reference numeral 20. As shown, the radio equipment 20 has a casing 22 which is made of an opaque material such as ABS resin. The casing 22 has thereinside an LCD or similar display 24 and an EL lamp 26 which back-lights the display 24. A display window 24a is formed through one or upper major wall 22a of the opaque casing 22 in alignment with the display 24, and it is closed by a transparent plastic, for example. An EL lamp 26 extends over the entire area of the back of the display 24 and illuminates the entire area of the latter when turned on. The EL lamp 26 is responsive to light which is incident to the entire surface of the display 24 and transmitted through the semitransparent liquid crystal of the display 24 to the lamp 26. The EL lamp 26, therefore, senses illumination in terms of electrostatic capacity which varies with the incident light. It is noteworthy that the casing 22 of the radio equipment 20 does not have the opening 26 formed in the prior art radio equipment 10 for guiding light to the light-sensitive element. The display 24 and the EL lamp 26 are respectively connected to a display driver 76 and a switching circuit 86 which will be described.

Specific constructions of the display 24 and EL lamp 26 will be described with reference to FIGS. 4A to 4D and 5A and 5B.

Figure 5A:
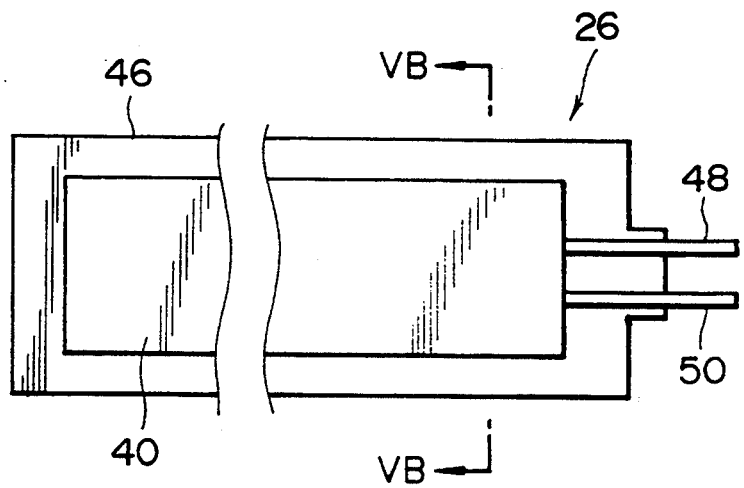
FIG. 5A is a plan view of an EL lamp included in the equipment of FIG. 3.
Figure 5B:
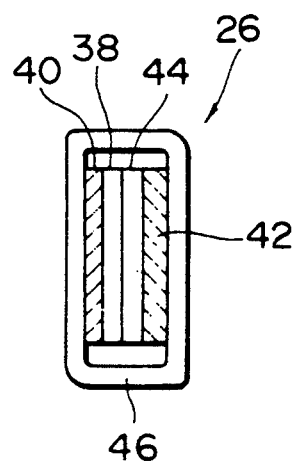
FIG. 5B is a section along line VB—VB OF FIG. 5A.

As shown in FIGS. 4A to 4D, the display 24 has an upper and a lower glass plate 28 and 30 which sandwich liquid crystal therebetween, an upper transparent polarizing plate 32 laid on the upper glass plate 28 for collecting light from the outside, and a lower semitransparent polarizing plate 34 laid on the lower glass plate 30 to serve as a reflector. The lower glass plate 28 has at opposite sides thereof a pair of transparent terminal portions 36a and 36b for applying a voltage to the liquid crystal of the display 24. As shown in FIGS. 5A and 5B, the EL lamp 26 has an electroluminescent layer 38 which emits light in responce to a voltage, a transparent electrode 40 laminated on the top of the layer 38, and a back electrode 42 laminated on the underside of the layer 38 with the intermediary of a reflective insulating layer 44. The laminate of transparent electrode 40, electroluminescent layer 38, reflective insulating layer 44 and back electrode 42 is covered by a transparent film or covering 46. When a voltage is applied across the electrodes 40 and 42, the electroluminescent layer 38 emits light. This is implemented by connecting external terminals 48 and 50 to the electrodes 40 and 42, respectively, and exposing a part of the external terminals 48 and 50 to the outside, as illustrated. The reflective insulating layer 44 serves to steer the light issuing from the electroluminescent layer 38 upward only, i.e., toward the display 24 only.

Referring to FIG. 6, control circuitry installed in the radio equipment 20 having the display 24 and EL lamp 26 will be described. As shown, the control circuitry, generally 60, has a control section 62. Connected to the control section 62 are a radio section 64 having an antenna 64a, an external operating section 66, an identification number store section 68, a display store section 70, a speaker driver 72 for driving a speaker 74, and the display driver 76. A lamp control unit 78 is connected to the display driver 76 and controls the emission of the EL lamp 26 and the sensing of illumination. A modulated signal transmitted from a remote station, not shown, comes in through the antenna 64a and is demodulated by the radio section 64. Implemented by a ROM, the identification number store section 68 stores the identification number assigned to the radio equipment 20. The display store section 70 memorizes through the control section 62 a display information signal which may be contained in the received signal. The control section 62 is made up of a microprocessor and a logic circuit implemented by software or random logic. One who carries the radio equipment 20 may operate the external operating section 66 as needed. When operated, the operating section 66 accesses the control section 62 to deactivate the display 24 or the speaker 74 or to read display information out of the display store section 70 and display it on the display 24 via the display driver 76 as information, as the case may be. The lamp control unit 78 has a control circuit 80. The display driver 76, an illumination sensing circuit 82, a light emitting circuit 84 and a switching circuit 86 are connected to the control circuit 80. The switching circuit 86 is constituted by a relay, for example, and connected to the EL lamp 26.

In operation, the radio equipment 20 receives the identification number particular to the equipment 20 and display information which have been modulated to a radio frequency. The identification number and display information coming in through the antenna 64a are demodulated by the radio section 64 and then applied to the control section 62. The control section 62 feeds a read signal to the identification number store section 68 to read the content out of the latter. Then, the control section 62 compares the demodulated signal from the radio section 64 with the signal read out of the identification number store section 68. On coincidence of the two signals, the control section 62 delivers a sounding signal to the speaker driver 72. The speaker driver 72 in turn feeds the sounding signal to the speaker 74 while amplifying it. The speaker 74 converts the input electric signal into sound. When the received signal contains a display information signal, the control section 62 read it out and applies it to the display information store section 70. The display information signal applied to the display driver 76 is subjected to code conversion while being converted into a signal which is necessary for the display 24. When the display 24 displays information thereon, the output of the display driver 76 to the control circuit 80 is in a high level. Then, the control circuit 80 controls the switching circuit 86 to interconnect the illumination sensing circuit 82 and EL lamp 26. Subsequently, the control circuit 80 commands the illuminating sensing circuit 82 the drive of the EL lamp 26 and reads the resulting illumination. When the control circuit 80 determines that the ambient illuminating is too low to see the display 24, it controls the switching circuit 86 to interconnect the EL lamp 26 and the light emitting circuit 84. Thereafter, the control circuit 80 causes the light emitting circuit 84 to drive the EL lamp 26 thereby back-lighting the display 24. If the ambient illumination is high enough for one to read the display 24, the control circuit 80 does not effect such back-lighting.

Figure 7:
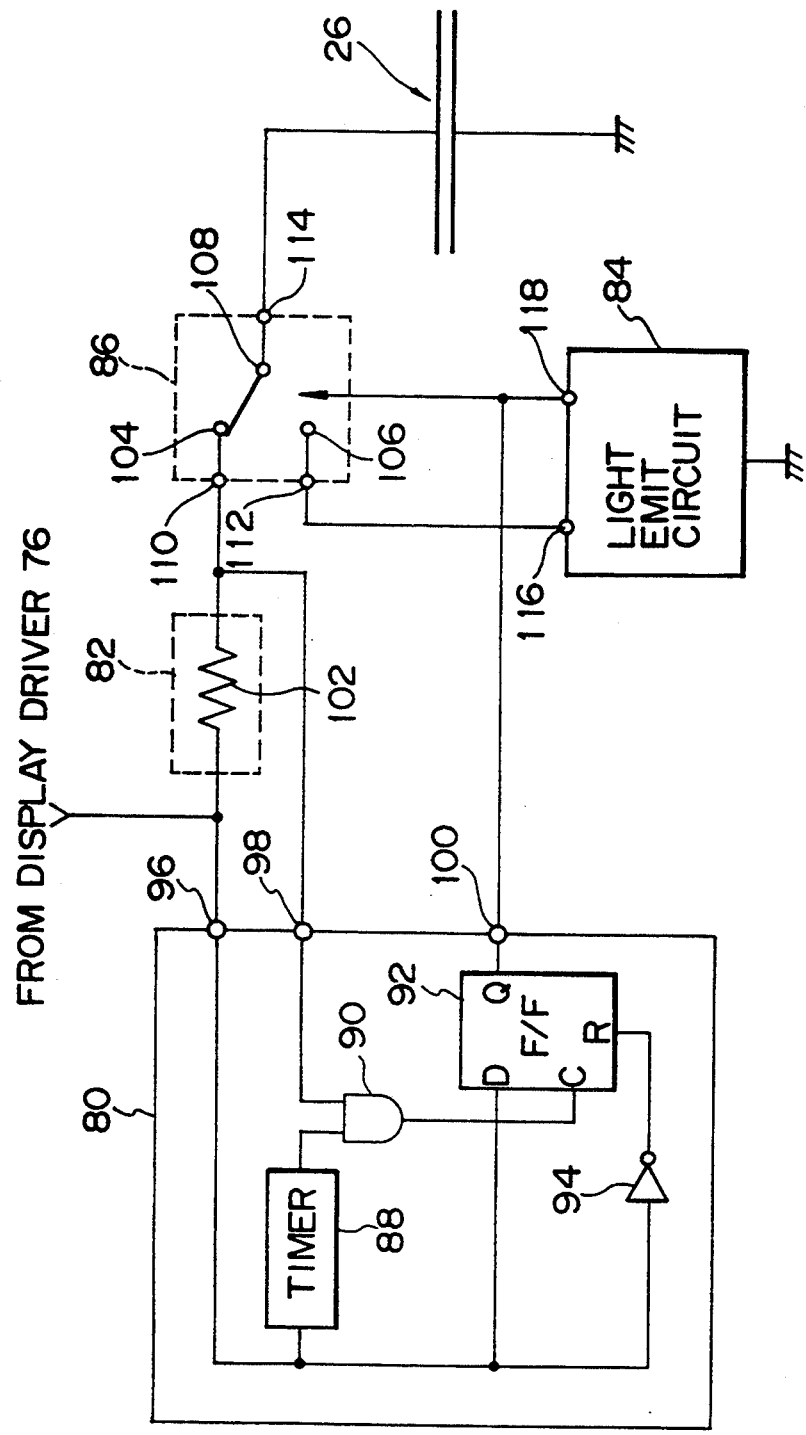
FIG. 7 is a schematic diagram showing an EL lamp control unit included in the circuitry of FIG. 6.

FIG. 7 shows a specific construction of the lamp control unit 78. In the figure, the same components and structural elements as those shown in FIG. 6 are designated by like reference numerals. As shown, the control circuit 80 is made up of a timer 88, an AND gate 90, a D-type flip-flop 92, and an inverter 94. The control circuit 80 has two input ports 96 and 98 and a single output port 100. The illumination sensing circuit 82 is implemented by a single resistor 102 which is connected at one end to the input port 96 of the control circuit 80 and display driver 76 and at the other end to the input port 98. The switching circuit 86 has two stationary contacts 104 and 106 and one movable contact 108. The stationary contacts 104 and 106 are connected to terminals 110 and 112, respectively, while the movable contact 108 is connected to a terminal 114. The terminal 110 is connected to the above-mentioned other end of the resistor 102, while the terminal 114 is connected to the EL lamp 26. The light emitting circuit 84 has an emission signal output terminal 116 and a power input terminal 118. The terminal 116 is connected to the terminal 112 of the switching circuit 86, and the terminal 118 is connected to the input port 100 of the control circuit 80 and the terminal 114 of the movable contact 108. More specifically, the output port 100 delivers a control signal for shifting the movable contact 108 of the switching circuit 86 and is connected to the power input terminal 118 of the light emitting circuit 84 also. The output port 100, therefore, serves two different functions at the same time, i.e., the control over the switching circuit 86 and the supply of power to the light emitting circuit 84. When the output of the output port 100 is in a low level, the switching circuit 86 shifts the movable contact 108 to interconnect the terminal 114, movable contact 108, stationary contact 104 and terminal 110 for thereby connecting the illumination sensing circuit 82 to the EL lamp 26. When the output of the output port 100 is in a high level, the switching circuit 86 shifts the movable contact 108 to interconnect the terminal 114, movable contact 108, stationary contact 106 and terminal 112 so as to interconnect the EL lamp 26 and light emitting circuit 84.

A more specific operation of the lamp control unit 78 is as follows. While the display 24 displays information, the display driver 76 continuously feeds a high level signal to the input port 96 of the control circuit 80. While the display 24 does not display any information, the input port 96 is maintained in a low level. Assume that the display 24 is not displaying information and, therefore, the input port 96 is in a low level. While the input port 96 is in a low level, the timer 88 does not operate and its output remains in a low level. In this condition, the output of the AND gate 90 and, therefore, the C terminal input of the flip-flop 92 remains in a low level. The inverter 94 feeds a high level signal to the flip-flop 92 and thereby maintains it in a reset state. Hence, when the input port 96 is in a low level, the Q terminal output of the flip-flop 92 and, therefore, the output port 96 is in a low level.

When the signal fed to the input port 96 turns from a low level to a high level, the output of the inverter 94 is changed from a high level to a low level to in turn set the flip-flop 92. Then, the D terminal input of the flip-flop 92 which is directly connected to the input port 96 turns from a low level to a high level. On the change of the C terminal input from a low level to a high level, the content of the flip-flop 92 turns from a low level to a high level and, as a result, the Q terminal output turns to a high level. The timer 88 begins to produce a high level signal on the turn of the input port 96 from a low level to a high level and, when a predetermined period of time expires, turns to a low level. The AND gate 90 produces AND of the output signal of the timer 88 and the signal fed to the input port 98 and delivers it to the C terminal input of the flip-flop 92. At this instant, whether the C terminal input of the flip-flop 92 turns to a high level or not depends on the state of the input port 98 which is associated with the high-level output of the timer 88. Immediately before the turn of the input port 96 from a low level to a high level, the Q terminal output of the flip-flop 92 is in a low level so that the switching circuit 86 holds the EL lamp 26 and illumination sensing circuit 82 in connection. Therefore, on the change of the output signal of the display driver 76 from a low level to a high level, the input port 98 reads an output of an integrating circuit which is constituted by the series connection of the resistor 102 of the illumination sensing circuit 82 and the EL lamp 26.

Equivalently, the EL lamp 26 is a capacitor and changes its electrostatic capacity in response to light which is incident to its light emitting surface, as discussed previously. Specifically, the electrostatic capacity increases in a light place and decreases in a dark place. While the electrostatic capacity of the EL lamp 26 varies over a certain range depending on the size of the lamp, it is usually several nanofarads to several tens of nanofarads. It follows that the result of integration appearing on the input port 98 varies with the ambient light, as will be described with reference to FIGS. 8A to 8F.

In FIGS. 8A to 8F, the outputs of the various components of the control circuit 80 which appear in a light place are labeled [A], while those which appear in a dark place are labeled [B]. When a high level signal indicating that the display 24 is in operation is fed from the display driver 76 to the control circuit 80, an integrated waveform appears on the input port 98, as shown in FIG. 8B. The AND gate 90 ANDs the integrated waveform and the output of the timer 88 and delivers the resulting AND to the C terminal input of the flip-flop 92 which defines the data reading timing of the D terminal input. The output of the timer 88 turns to a high level at the same time as the input port 96 and, on the lapse of a predetermined period of time, returns to a low level. The potential of the input port 98 which is necessary for the output of the AND gate 90 to remain in a high level while the output of the timer 88 is in a high level is the threshold level Th which is shown in FIG. 8B. The threshold level Th is usually defined at substantially the intermediate potential between the high and low levels and is coincident with the time constant of the series connection of the resistor 102 of the illumination sensing circuit 82 and EL lamp 26. For a boundary illumination which determines whether or not to effect illumination, the duration T of the operation of the timer 88 is selected as follows:

, $T[s]$=resistance $[\Omega]$ of resistor 102 $\times$ electrostatic capacity $[F]$ of EL lamp 26

As the waveforms [A] of FIGS. 8A to 8C indicate, when the ambience is light, the potential of the input port 98 does not exceed the threshold level Th so long as the output of the timer 88 is in a high level. Hence, the output of the AND gate 90 does not turn to a high level. On the other hand, when the ambience is dark, the potential of the input port 98 exceeds the threshold level Th while the timer 88 is in a high level, as represented by [B] in the figures. Then, the output of the AND gate 90 remains in a high level from the instant when the potential exceeds the threshold level Th to the instant when the output of the timer 88 turns to a low level. This changes the C terminal input of the flip-flop 92 to a high level. Hence, the flip-flop 92 holds the data applied to the D input while feeding it out via the Q terminal output. The D terminal input is in a high level because it is connected the input port 96. As a result, the Q terminal output of the flip-flop 92 turns from a low level to a high level. When the display 24 is disabled, the output of the display driver 76 changes from a high level to a low level to thereby cause the input port 98 into a low level. Since the input port 96 is the integration circuit of the EL lamp 26 and resistor 102, it turns to a low level at a particular timing as shown in FIG. 8B. When the input port 96 turns to a low level, the output of the inverter 94 turns to a high level to reset the flip-flop 92 and thereby the output port 100 to a low level.

Hereinafter will be described how the switching circuit 86 and light emitting circuit 84 operate in association with the logical state of the output port 100.

While the output port 100 is in a low level, the switching circuit 86 holds the illumination sensing circuit 82 and EL lamp 26 in connection. On the turn of the output port 100 to high level, the switching circuit 86 so operates as to interconnect the light emitting circuit 84 and EL lamp 26. The output port 100 is connected to the power input terminal 118 of the light emitting circuit 84. The high level of the output port 100 enables the light emitting circuit 84, i.e., the circuit 84 causes the EL lamp 26 to emit light via the emission signal output terminal 116 and switching circuit 86. Then, the EL lamp 26 back-lights the display 24. On the change of the input port 100 to a low level, the switching circuit 86 disconnects the light emitting circuit 84 from the EL lamp 26 and, instead, connects the illuminance sensing circuit 82 to the EL lamp 26. Also, the change of the input port 100 to a low level interrupts the supply of power to the light emitting circuit 84, whereby the circuit 84 is disabled. By such operations of the switching circuit 86 and the deactivation of the light emitting circuit 84, the EL lamp 26 stops emitting light.

While in the illustrative embodiment the control circuit 80 and illumination sensing circuit 82 are constructed independently of the equipment, they may be readily built in the control section 62 of the equipment by integration technology.

In summary, it will be seen that the present invention provides portable radio equipment which back-lights a display thereof surely and, yet, without wasteful consumption of power. Specifically, paying attention to the fact that an EL lamp changes its electrostatic capacity in response to ambient light and usually functions to provide back-light for illuminating an LCD or similar display, the present invention uses an EL lamp associated with a display for implementing a light-sensitive element and thereby senses light incident to an LCD with accuracy.

Various modifications will become possible for those skilled in the art after receiving the teachings of the present disclosure without departing from the scope thereof.

What is claimed is:

1. Portable radio equipment having a display for displaying a message, comprising:

illuminating means comprising an electroluminescent lamp, having a function of back-lighting the display and a function of sensing illumination on a display surface of the display;

first driver means for driving said illuminating means to sense illumination on the display surface of the display;

second driver means for driving said illuminating means to cause said illuminating means to emit light;

switching means for selecting either one of an illumination sense mode wherein said illuminating means senses illumination and a back-light mode wherein said illuminating means emits light; and control means for controlling said first and second driver means and said switching means to select either one of said illumination sense mode and said back-light mode, wherein said control means comprises:

a first and second input port connected to said first driver means and said switching means;

an output port connected to said switching means and said second driver means;

a timer having an input terminal connecting to said first input port;

an AND gate having one input terminal connecting to an output terminal of said timer and the other input terminal connecting to said second input port;

an inverter having an input terminal connecting to said first input port; and a D-type flip-flop having a C terminal connecting to an output terminal of said AND gate, an R terminal connecting to an output terminal of said inverter, and a Q terminal connecting to said output port.

2. A control device for use with portable radio equipment having a display for displaying a message and illuminating means comprising an electroluminescent lamps, having a function of back-lighting said display and a function of sensing illumination on a display surface of said display for controlling said illuminating means, said control device comprising:

first driver means for driving said illuminating means to sense illumination on the display surface of the display;

second driver means for driving said illuminating means to cause said illuminating means to emit light;

switching means for selecting either one of an illumination sense mode wherein said illuminating means senses illumination and a back-light mode wherein said illuminating means emits light; and control means for controlling said first and second driver means and said switching means to select either one of said illumination sense mode and said back-light mode, wherein said control means comprises:

a first and second input port connected to said first driver means and said switching means;

an output port connected to said switching means and said second driver means;

a timer having an input terminal connecting to said first input port;

an AND gate having one input terminal connecting to an output terminal of said timer and the other input terminal connecting to said second input port;

an inverter having an input terminal connecting to said first input port; and a D-type flip-flop having a C terminal connecting to an output terminal of said AND gate, an R terminal connecting to an output terminal of said inverter, and a Q terminal connecting to said output port.

* * * * *

UNITED STATES PATENT AND TRADEMARK OFFICE
CERTIFICATE OF CORRECTION

PATENT NO. : 5,337,073
DATED : 8/9/94
INVENTOR(S) : Hideyuki TSUNODA et al.

It is certified that error appears in the above-identified patent and that said Letters Patent is hereby corrected as shown below:

Col. 3, line 35, delete "SL" and insert --5L--.

Signed and Sealed this

Eighteenth Day of April, 1995

Attest:

BRUCE LEHMAN

Attesting Officer

Commissioner of Patents and Trademarks